(12) United States Patent
Diepstraten et al.

(10) Patent No.: US 11,137,564 B2
(45) Date of Patent: Oct. 5, 2021

(54) HARDENED FAN-OUT ARRANGEMENT

(71) Applicant: COMMSCOPE TECHNOLOGIES LLC, Hickory, NC (US)

(72) Inventors: Patrick Jacques Ann Diepstraten, Heusden-Zolder (BE); Daniel Eduardo Herrera, Chihuahua (MX); Darren Craig Atkinson, Halstead (GB); Roman Kamenik, Kuparovice (CZ); Emmanuel Alberto Altamirano Escobedo, Chihuahua (MX)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/634,007

(22) PCT Filed: Jul. 25, 2018

(86) PCT No.: PCT/US2018/043688
§ 371 (c)(1),
(2) Date: Jan. 24, 2020

(87) PCT Pub. No.: WO2019/023342
PCT Pub. Date: Jan. 31, 2019

(65) Prior Publication Data
US 2020/0209501 A1 Jul. 2, 2020

Related U.S. Application Data

(60) Provisional application No. 62/536,823, filed on Jul. 25, 2017.

(51) Int. Cl.
*G02B 6/44* (2006.01)

(52) U.S. Cl.
CPC .................. *G02B 6/4471* (2013.01)

(58) Field of Classification Search
None
See application file for complete search history.

(56) References Cited

U.S. PATENT DOCUMENTS 4,826,277 A * 5/1989 Weber .................. G02B 6/3878
385/100
6,104,855 A 8/2000 Jeon
(Continued)

FOREIGN PATENT DOCUMENTS

| WO | 2006/113726 A1 | 10/2006 |
| WO | 2008/118603 A1 | 10/2008 |

(Continued)

OTHER PUBLICATIONS

International Search Report and Written Opinion of the International Searching Authority for International Patent Application No. PCT/US2018/043688 dated Nov. 6, 2018, 11 pages.

(Continued)

*Primary Examiner* — Rhonda S Peace
(74) *Attorney, Agent, or Firm* — Merchant & Gould P.C.

(57) ABSTRACT

The present disclosure relates to a hardened fiber optic fan-out arrangement including a fan-out housing. A plurality of fiber optic pigtails projects outwardly from the fan-out housing. The fiber optic pigtails have free ends including hardened de-mateable fiber optic connection interfaces. A fiber optic feeder cable also projects outwardly from the fan-out housing. The fiber optic feeder cable is optically coupled to the fiber optic pigtails.

20 Claims, 16 Drawing Sheets

(56) References Cited

U.S. PATENT DOCUMENTS

| | | | |
|---|---|---|---|
| 6,816,663 B2 * | 11/2004 | Daoud | G02B 6/4471 385/136 |
| 7,127,148 B2 * | 10/2006 | Mozolowski | G02B 6/3878 385/137 |
| 7,277,614 B2 | 10/2007 | Cody et al. | |
| 7,397,997 B2 | 7/2008 | Mertesdorf et al. | |
| 7,428,366 B2 | 9/2008 | Mullaney et al. | |
| 7,469,091 B2 | 12/2008 | Mullaney et al. | |
| 7,844,158 B2 | 11/2010 | Gronvall et al. | |
| 8,571,367 B2 * | 10/2013 | Van Der Meulen | G02B 6/4477 385/100 |
| 10,353,164 B2 * | 7/2019 | Lane | G02B 6/4432 |
| 2004/0232275 A1 * | 11/2004 | Vogel | H02G 11/02 242/614 |
| 2005/0111799 A1 * | 5/2005 | Cooke | G02B 6/4472 385/100 |
| 2006/0088250 A1 * | 4/2006 | Pimpinella | G02B 6/4471 385/78 |
| 2006/0120672 A1 * | 6/2006 | Cody | G02B 6/4472 385/86 |
| 2006/0127026 A1 | 6/2006 | Beck | |
| 2006/0269208 A1 | 11/2006 | Allen et al. | |
| 2009/0060421 A1 * | 3/2009 | Parikh | G02B 6/4442 385/71 |
| 2012/0189256 A1 | 7/2012 | Allen et al. | |
| 2014/0219621 A1 | 8/2014 | Barnette, Jr. et al. | |
| 2014/0241670 A1 | 8/2014 | Barnette, Jr. et al. | |
| 2015/0078720 A1 | 3/2015 | Sedor et al. | |
| 2015/0268434 A1 | 9/2015 | Barnette, Jr. et al. | |
| 2015/0370029 A1 * | 12/2015 | Petersen | G02B 6/4471 385/114 |
| 2016/0041356 A1 | 2/2016 | Wang et al. | |
| 2016/0124173 A1 | 5/2016 | Kowalczyk et al. | |
| 2017/0371121 A1 * | 12/2017 | Marchek | G02B 6/4471 |
| 2020/0209501 A1 * | 7/2020 | Diepstraten | G02B 6/04 |
| 2020/0301090 A1 * | 9/2020 | Petersen | G02B 6/4472 |

FOREIGN PATENT DOCUMENTS

| | | |
|---|---|---|
| WO | 2013/117598 A2 | 8/2013 |
| WO | 2014/123940 A1 | 8/2014 |
| WO | 2014/167447 A1 | 10/2014 |
| WO | 2014/197894 A1 | 12/2014 |
| WO | 2016/206594 A1 | 12/2016 |

OTHER PUBLICATIONS

Back-fed Cable Stub Installation, Siecor Recommended Procedure SRP-009-002, SIECOR, 3 pages (Jan. 1993).

MPO Patch Cord/Fan-out Cord, Furukawa Electric Co, 4 pages (2001).

FTTA, Fiber to the antenna, SENKO Advanced Components, 4 pages (Admitted prior art as of Jul. 25, 2017).

FST: Flexible Service Terminal, TE Connectivity, 2 pages (2013).

OptiSheath® MultiPort Flex Terminal, Corning Optical Communications LLC, 3 pages (Jul. 2014).

MTP MPO Break-Out Cables Fan-Out Assemblies, Fibertronics, 4 pages (2011-2015).

* cited by examiner

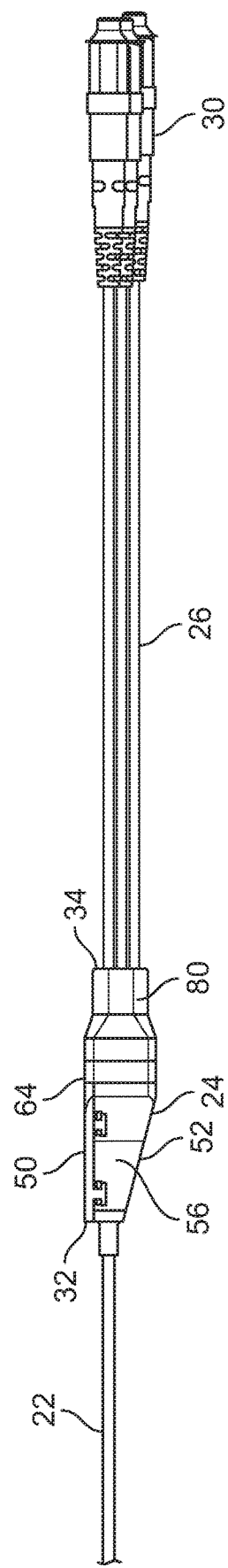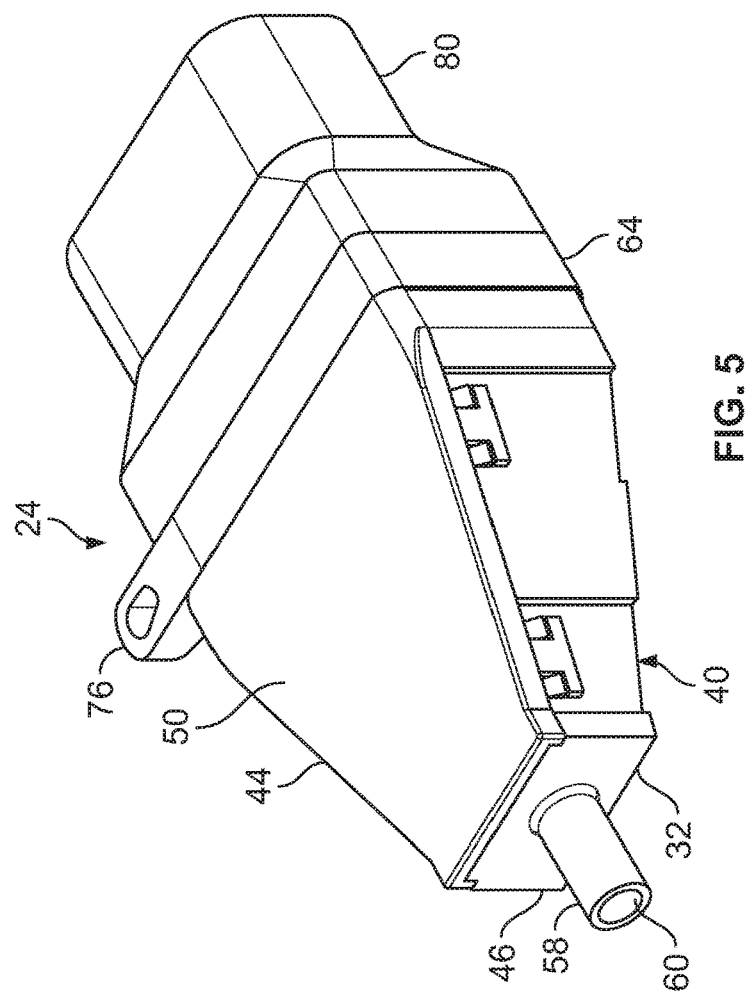
FIG. 4
FIG. 5

HARDENED FAN-OUT ARRANGEMENT

CROSS-REFERENCE TO RELATED APPLICATION

This application is a National Stage Application of PCT/US2018/043688, filed on Jul. 25, 2018, which claims the benefit of U.S. Patent Application Ser. No. 62/536,823, filed on Jul. 25, 2017, the disclosures of which are incorporated herein by reference in their entireties. To the extent appropriate, a claim of priority is made to each of the above disclosed applications.

TECHNICAL FIELD

The present invention generally relates to telecommunications cable assemblies and fiber optic connection arrangements.

BACKGROUND

Fiber optic telecommunications connectivity is being extended as part of fiber-to-the-home (FTTH) and/or fiber-to-the-premises (FTTP) efforts which are currently ongoing. In the effort to expand fiber optic connectivity, it is desirable to provide fiber optic connection locations in the vicinity of subscriber locations. Often, such fiber optic connection locations can be provided below grade (e.g., in hand-holes) at grade or aerially (e.g. on a pole). Thus, it is desirable for such connection locations to be hardened so as to be capable of withstanding outdoor environmental conditions. Often, hardened fiber optic connection locations are provided by multi-service terminals (e.g., drop terminals) which include hardened ports adapted for receiving hardened fiber optic connectors. Example multi-service terminals are disclosed by PCT publication number WO2008/118603; U.S. Pat. Nos. 7,397,997; and 7,844,158. Fiber optic connection devices having connectorized pigtails have also been developed. Example fiber optic connection devices of this type are disclosed by PCT Publication No. WO2014/197894; PCT Publication No. WO2014/167447; PCT Publication No. WO2014/123940; U.S. Pat. Nos. 7,277,614 and 7,428,366.

SUMMARY

One aspect of the present disclosure relates to a hardened fan-out assembly having a compact configuration.

Another aspect of the present disclosure relates to a hardened fan-out configuration having a fan-out housing that does not contain optical splices. Instead, optical fibers are routed from a feeder cable through the fan-out housing to pigtails in an uninterrupted manner without any intermediate splicing.

A further aspect of the present disclosure relates to a fan-out assembly having a feeder cable, a fan-out housing and a plurality of connectorized pigtails. In certain examples, the feeder cable is substantially longer than the connectorized pigtails. In certain examples, the feeder cable is at least five times, or at least ten times, or at least 20 times, or at least 30 times, or at least 50 times, or at least 100 times, or at least 200 times as long as the pigtails. In certain examples, the feeder cable is coiled on a spool prior to installation. In certain examples, the feeder cable has an end opposite the fan-out housing that is not connectorized. In certain examples, the optical fiber ends at the end of the feeder cable opposite from the fan-out housing are prepared to be splice-ready (e.g., for individual fusion splices, mechanical splices or mass fusion splices). In other examples, the optical fiber ends at the end of the feeder cable opposite from the fan-out housing can be connectorized with hardened or non-hardened fiber optic connectors (e.g., by single fiber connectors or by one or more multi-fiber connectors). In certain examples, the fan-out housing has a compact configuration. In certain examples, the fan-out housing contains an encapsulant (e.g., epoxy) that fills the fan-out housing, prevents water from entering the fan-out housing, and anchors the feeder cable as well as the pigtails relative to the fan-out housing. In certain examples, fan-out housing has a tapered configuration. In certain examples, the fan-out housing has major opposite sides that taper toward one another as the major opposite sides extend toward the feeder cable, and minor opposite sides that angle towards one another as the minor opposite sides extend toward the feeder cable. In certain examples, the fan-out housing includes an attachment structure for allowing the fan-out housing to be attached to a mounting structure/location (e.g., a wall, a hand-hole, a pole, a bracket, a frame, a cable, a wire, etc.). In certain examples, a shape-memory sleeve (e.g., a heat shrink sleeve) containing adhesive is used to provide a seal between the feeder cable and the fan-out housing. In certain examples, the hardened fan-out assembly includes four to twelve pigtails. In certain examples, the fan-out assembly includes at least four pigtails, or at least eight pigtails, or at least twelve pigtails. In certain examples, the pigtails of the fan-out assembly are terminated by de-mateable connection locations which may include hardened female connectors or hardened male connectors. In certain examples, the pigtails may all have the same length. In certain examples, sets of the pigtails may have different lengths so as to provide a staggered configuration in which the connectorized ends of the different sets of pigtails are staggered relative to one another. In certain examples, optical fibers at one end of the feeder cable can be spliced to an optical fiber or optical fibers of a distribution cable at a re-enterable enclosure.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows:

FIG. 4 is a side view of the hardened fan-out assembly of FIG. 1;

FIG. 5 is a perspective view of the fan-out housing of the fan-out assembly of FIG. 1 taken from a first perspective;

DETAILED DESCRIPTION

Figure 1:
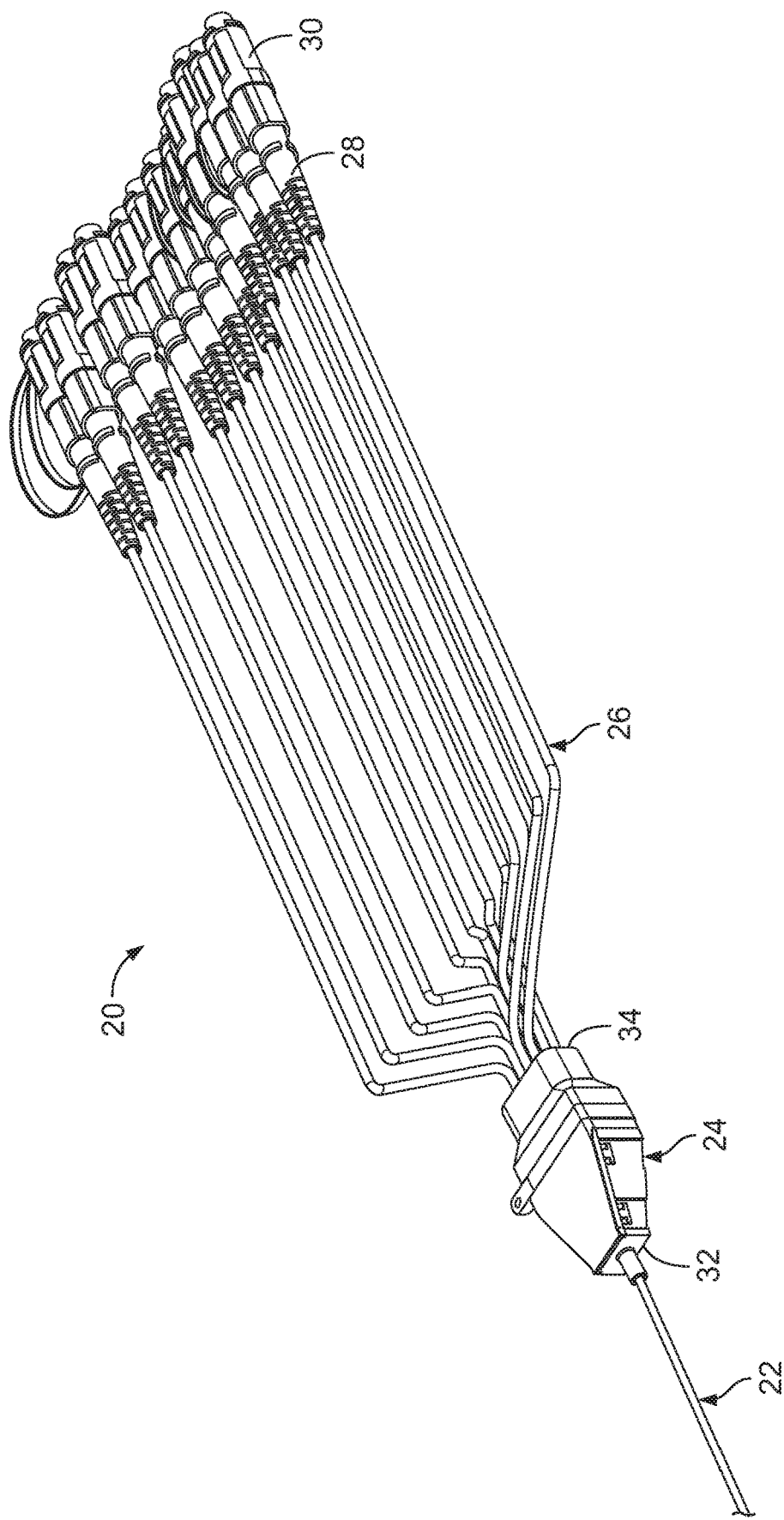
FIG. 1 is a perspective view of a hardened fan-out assembly in accordance with the principles of the present disclosure.

FIG. 1 illustrates a hardened fan-out assembly 20 in accordance with the principles of the present disclosure. The hardened fan-out assembly 20 includes a feeder cable 22, a hardened fan-out housing 24, and a plurality of fiber optic pigtails 26. Preferable, the fiber optic pigtails 26 have free-ends 28 including hardened de-mateable fiber optic connection interfaces 30. In certain examples, the hardened de-mateable fiber optic connection interfaces 30 can include hardened fiber optic connectors such as hardened female fiber optic connectors or hardened male fiber optic connectors. The hardened de-mateable fiber optic connection interfaces 30 can include single fiber or multi-fiber (e.g., duplex or more than two fibers) fiber optic connectors.

In the depicted example, the hardened fan-out assembly 20 has an in-line configuration in which the feeder cable 22 extends from a first end 32 of the fan-out housing 24 and the fiber optic pigtails 26 extend from an opposite second end 34 of the fan-out housing 24. Thus, the feeder cable 22 and the fiber optic pigtails 26 extend outwardly from the fan-out housing 24 in opposite directions. While it is preferred for the fan-out housing 24 to have an in-line configuration, it will be appreciated that in other examples the fiber optic pigtails 26 and the feeder cable 22 can extend outwardly from the fan-out housing in the same direction from one end of the fan-out housing, or can be angled relative to each other (e.g., oriented at right angles, acute angles or obtuse angles).

It will be appreciated that the feeder cable 22 preferably includes a plurality of optical fibers that are fanned-out from one another within the fan-out housing 24 and routed individually to the fiber optic pigtails 26. In certain examples, the feeder cable 22 includes four to twelve optical fibers and a corresponding number of fiber optic pigtails 26 are provided. In certain examples, the feeder cable 22 includes at least four optical fibers and the fan-out assembly 20 includes at least four fiber optic pigtails 26. In other examples, the feeder cable 22 includes at least eight optical fibers and the fan-out assembly 20 includes at least eight fiber optic pigtails 26. In still other examples, the feeder cable 22 includes at least twelve optical fibers and the fan-out assembly 20 includes at least twelve fiber optic pigtails 26. In other examples, more than one fiber can be routed through at least some of the pigtails. For example, at least some of the pigtails can include two optical fibers and can have free ends terminated by hardened duplex fiber optic connectors. Alternatively, at least some of the pigtails can include more than two optical fibers and can have free ends terminated by hardened multi-fiber fiber optic connectors that can accommodate more than two optical fibers (e.g., the connectors can include ferrules that each receive more than two optical fibers). The fiber optic connectors can include ferruled connectors and ferrule-less connectors (examples of ferrule-less connectors are shown by PCT Publication No. WO 2013/117598, which is hereby incorporated by reference in its entirety).

It is preferred for the feeder cable 22 to be substantially longer than the fiber optic pigtails 26. In certain examples, the fiber optic pigtails have lengths less than or equal to 3 meters, or lengths less than or equal to 2 meters, or lengths less than or equal to 1.5 meters, or lengths less than or equal to 1 meter. In certain examples, the feeder cable 22 has a length equal to or greater than 10 meters, or a length equal to or greater than 50 meters, or a length equal to or greater than 100 meters, or a length equal to or greater than 200 meters, or a length equal to or greater than 250 meters, or a length equal to or greater than 300 meters. In certain examples, the length of the feeder cable 22 is at least 3, 4, 5, 10, 20, 50, 100, 200, 250, or 300 times as long as the individual lengths of the fiber optic pigtails 26.

As depicted by the example shown in FIG. 1, the fan-out assembly 20 includes sets of pigtails with the pigtails of each set having a different length. This assists in staggering at least some of the connectorized ends of the pigtails when the pigtails are extended. In other examples, all the pigtails can have the same length or all of the pigtails can have different lengths.

Figure 2:
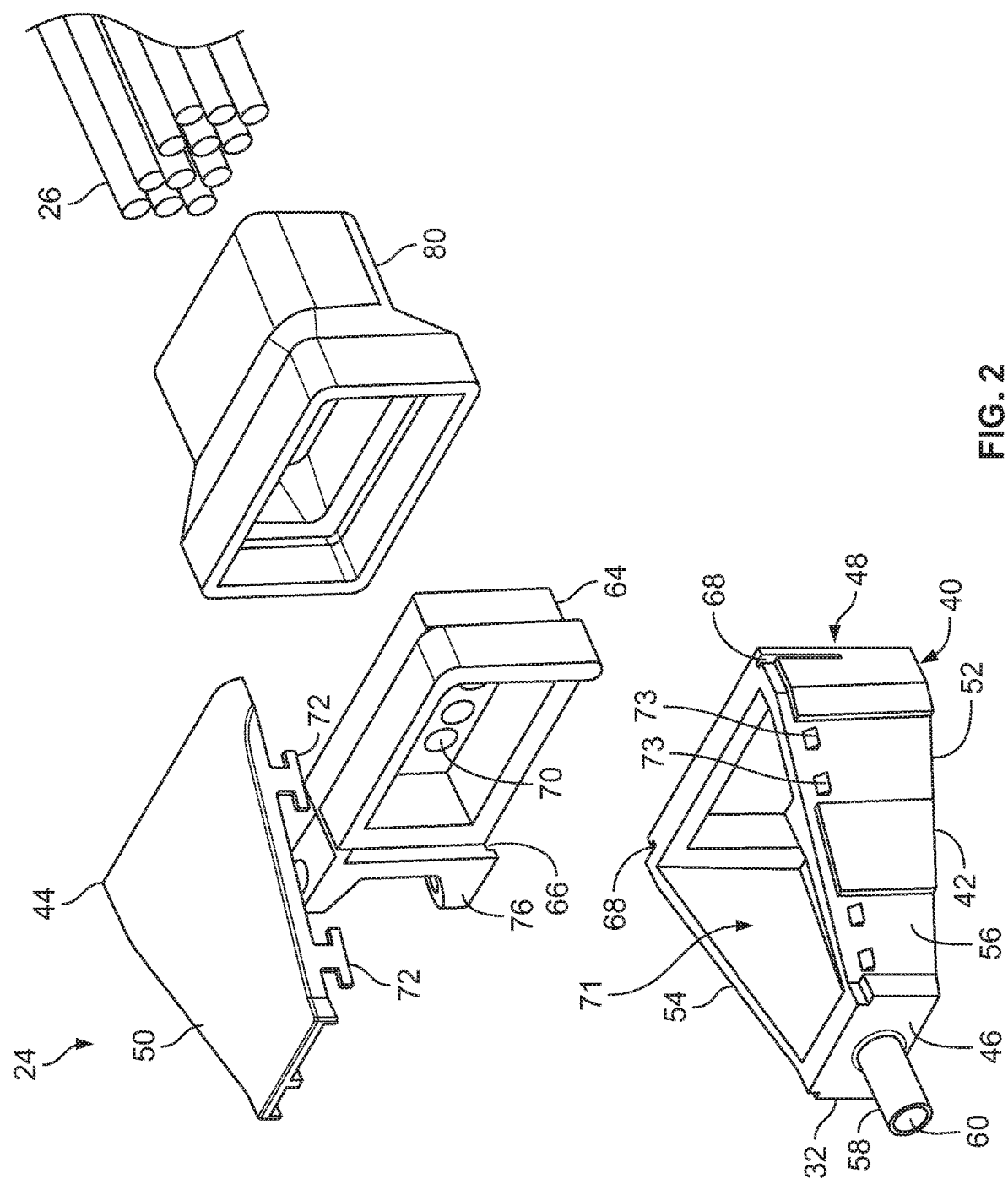
FIG. 2 is an exploded view of a fan-out housing of the fan-out assembly of FIG. 1.
Figure 3:
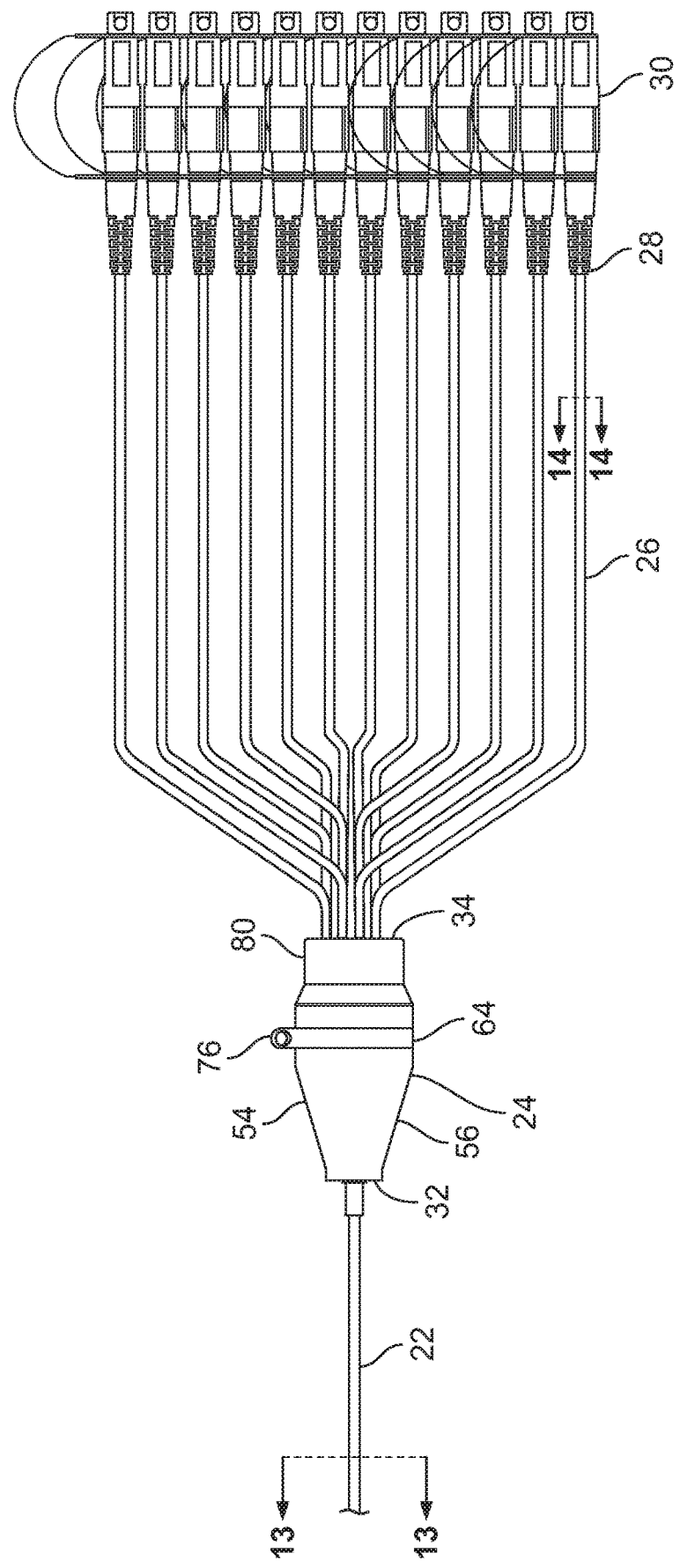
FIG. 3 is a plan view of the hardened fan-out assembly of FIG. 1.

Referring to FIG. 2, the fan-out housing 24 includes a main body 40 formed by a base 42 and a cover 44. The main body 40 includes a minor end 46 positioned opposite from a major end 48. The minor end 46 is positioned at the first end 32 of the fan-out housing 24. The main body 40 also includes oppositely positioned major sides 50, 52 that extend longitudinally between the minor and major ends 46, 48. The major side 50 is defined by the cover 44 and the major side 52 is defined by the base 42. The main body 40 also includes minor sides 54, 56 defined by the base 42 that extend longitudinally between the minor and major ends 46, 48 and also extend between the major sides 50, 52. The minor sides 54, 56 are angled relative to one another so as to converge as the minor sides 54, 56 extend from the major end 48 toward the minor end 46. Thus, the base 42 has a tapered configuration when viewed in plan view as shown by FIG. 3. The major side 52 is angled relative to the major side 50 such that the major sides, 50, 52 converge as the major sides 50, 52 extend from the major end 48 toward the minor end 46. Thus, the main body 40 has a tapered configuration when viewed from the side view of FIG. 4.

A stub 58 is shown projecting outwardly from the minor end 46 of the main body 40. The stub 58 defines a cable opening 60 for receiving the feeder cable 22. The cable opening 60 defines an axis 62 (shown in FIG. 8) that extends longitudinally through a length of the fan-out housing 24. In one example, the major side 50 defined by the cover 44 is parallel to the axis 62 and the major side 52 defined by the base 42 is angled at an acute angle relative to the axis 62. In certain examples, a shape-memory sleeve 47 (e.g., a heat-shrink sleeve containing adhesive, see FIG. 12) can be mounted over the stub 58 and the end portion of a jacket of the feeder cable 22 to provide sealing between the feeder cable 22 and the fan-out housing 24.

Figure 10:
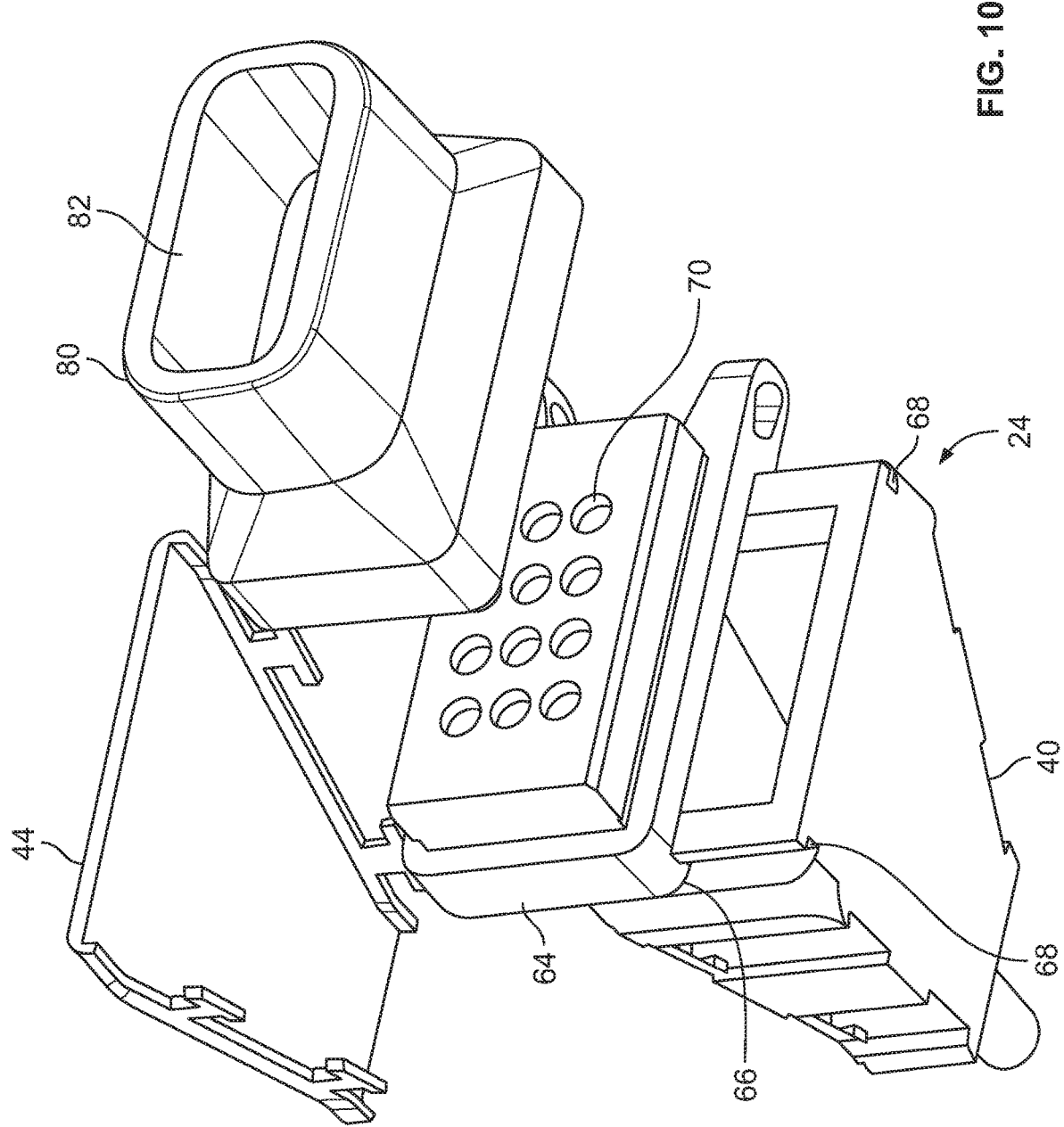
FIG. 10 is an exploded view of the fan-out housing of FIG. 5.
Figure 11:
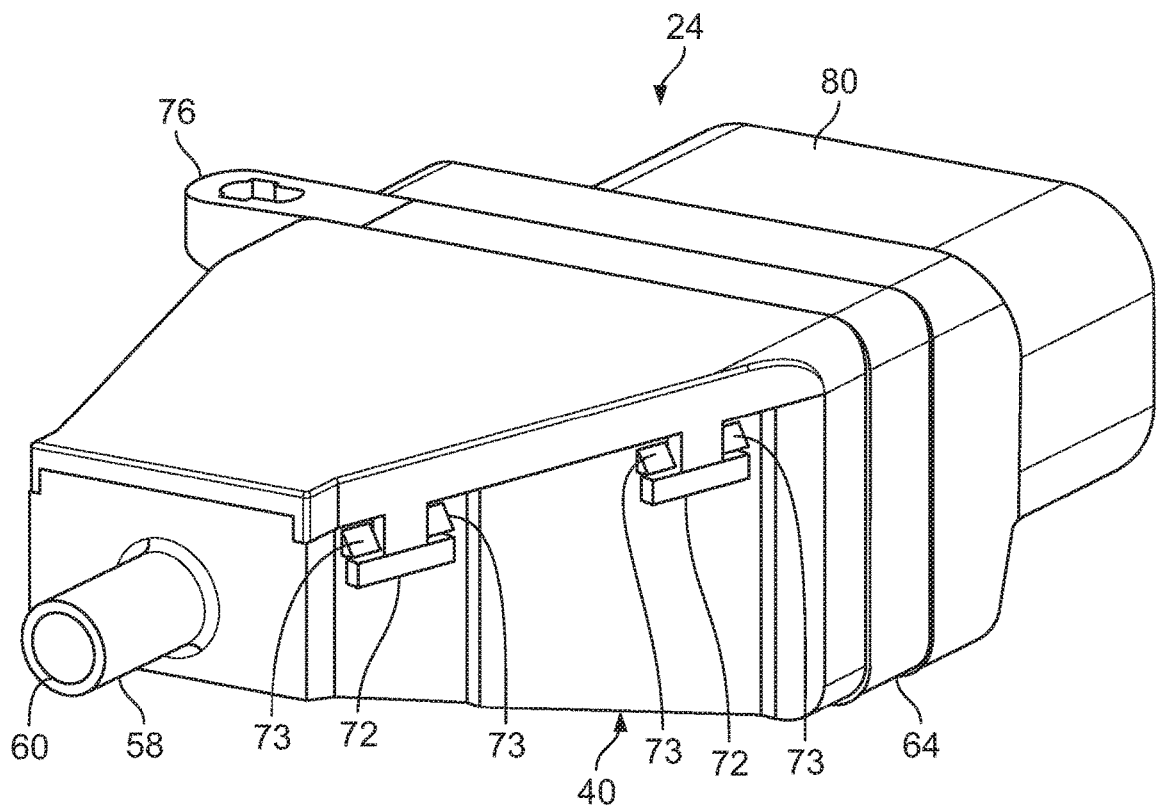
FIG. 11 is another perspective view of the fan-out housing of FIG. 5.

Referring still to FIG. 2, the fan-out housing 24 further includes an end-wall structure 64 that mounts at the major end 48 of the main body 40. In certain examples, the end-wall structure 64 can be secured to the main body 40 by a mechanical or adhesive attachment technique. In the depicted example, the end-wall structure 64 connects to the main body 40 by a mechanical interlock. For example, the end-wall structure 64 can include rails 66 that fit within corresponding channels 68 defined by the main body 40 (see also FIGS. 10 and 12). In other examples, the rails and the channels can be reversed such that the main body 40 includes rails that fit within corresponding channels defined by the end-wall structure 64. The rail and channel configuration allows the end-wall structure 64 to be secured to the main body 40 by a slide-lock configuration including a slideable connection interface. In other examples, a snap-fit configuration can be used.

Figure 12:
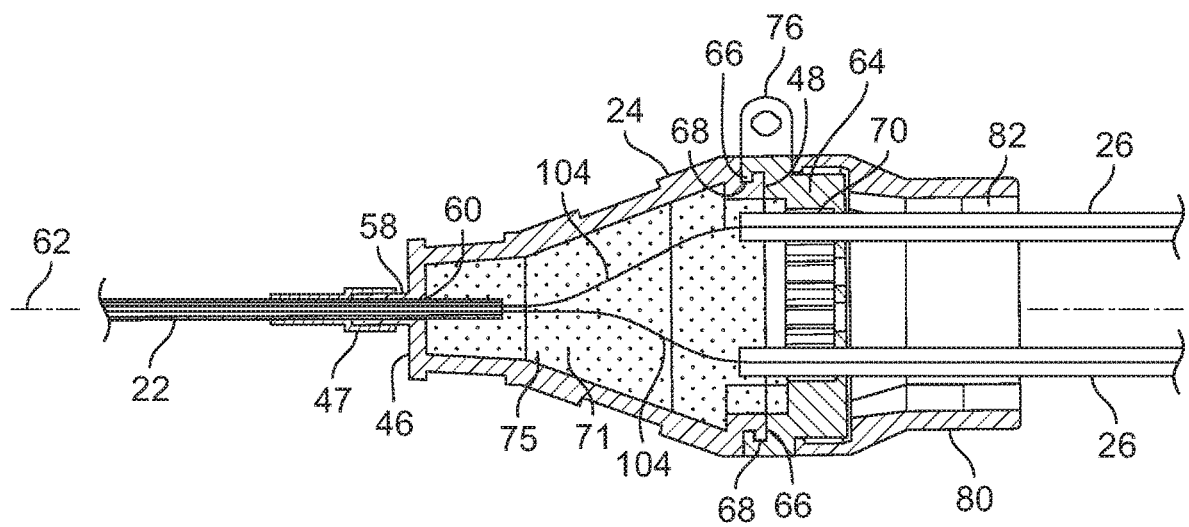
FIG. 12 is a cross-sectional plan view of the fan-out housing taken along section line 12-12 of FIG. 7 with a splice-less fiber routing scheme depicted and also showing a filling material within an interior volume of the fan-out housing.

Referring now to FIGS. 2 and 12, the end-wall structure 64 can define a plurality of pigtail openings 70 that in certain examples can be arranged in rows. The pigtail openings 70 allow end portions of the fiber optic pigtails 26 to be inserted into an interior volume 71 of the fan-out housing 24. In certain examples, a filling/encapsulating material 75 can be used to fill the interior volume 71 of the fan-out housing 24 and encapsulate the optical fibers routed there-through. In certain examples, the encapsulating/filling material 75 can have adhesive properties and can bond to the optical fibers. In certain examples, the filling/encapsulating material 75 can prevent water from entering the interior volume 71 of the fan-out housing 24. In one example, the encapsulating/filling material 75 can include a curable material. In one example, the filling/encapsulating material 75 can include an epoxy material. In certain examples, an end portion of the feeder cable 22 as well as end portions of the fiber optic pigtails 26 can extend into the interior volume 71 of the fan-out housing 24 and can be embedded in and bonded to the encapsulating/filling material 75. In certain examples, the portions of the cables extending into the interior volume 71 can include cable jackets and cable strength members (e.g., reinforcing yarns such as Aramid yarns, fiberglass strength members, or other reinforcing elements). The end-wall structure 64 can function as a barrier for preventing the encapsulating/filling material 75 from flowing out of the interior volume 71 of the fan-out housing 24 during the filling process. Preferably, the encapsulating/filling material 75 is curable and solidifies when cured. In certain examples, the encapsulating/filling material can be cured by tempera- ture, ultraviolet light or other means. Preferably, the encapsulating/filling material 75 has adhesive bonding properties.

By removing the cover 44, a major side of the fan-out housing 24 is open to provide access to the interior volume 71 for routing fibers 104 through the interior from the feeder cable 22 to the fiber optic pigtails 26 and for introducing the encapsulating/filling material 75 into the interior volume 71 after the optical fibers 104 have been routed through the interior volume 71. Once the interior volume 71 has been filled with the encapsulating/filling material 75, the cover 44 can be mounted to the base 42 to enclose the open major side. When the encapsulating/filling material 75 cures, the cover 44 can be bonded permanently in place with respect to the base 42. In other examples, the fan-out housing 24 can define an injection port for injecting the encapsulating/filling material 75 into the interior volume 71 with the cover 44 pre-mounted in place at the major side 50 of the fan-out housing 24.

In certain examples, the cover 44 can be initially secured to the main body 40 by a mechanical attachment interface. In one example, the mechanical attachment interface can include a snap-fit connection. As depicted, the mechanical attachment interface can include a latching arrangement. As depicted, the latching arrangement optionally includes T-shaped latches 72 that latch onto corresponding retainers 73 on the minor sides 54, 56 to secure the cover 44 to the base 42.

In certain examples, the end-wall structure 64 can also include a mounting feature 76 for securing the fan-out housing 24 to a structure such as a wall, a pole, a hand-hole, a bracket, a cable, a wire or other structure by a fastener or other connection structure. In certain examples, the mounting feature 76 can include a tab defining an opening. In certain examples, the mounting feature 76 can work in combination with brackets and other fastening elements (e.g., fasteners such as bolts or screws, bracket arrangements, clips, ties such as cable ties, straps, bands or other structures) to allow the fan-out housing 24 to be secured in place at a given mounting location relative to a given structure.

Figure 6:
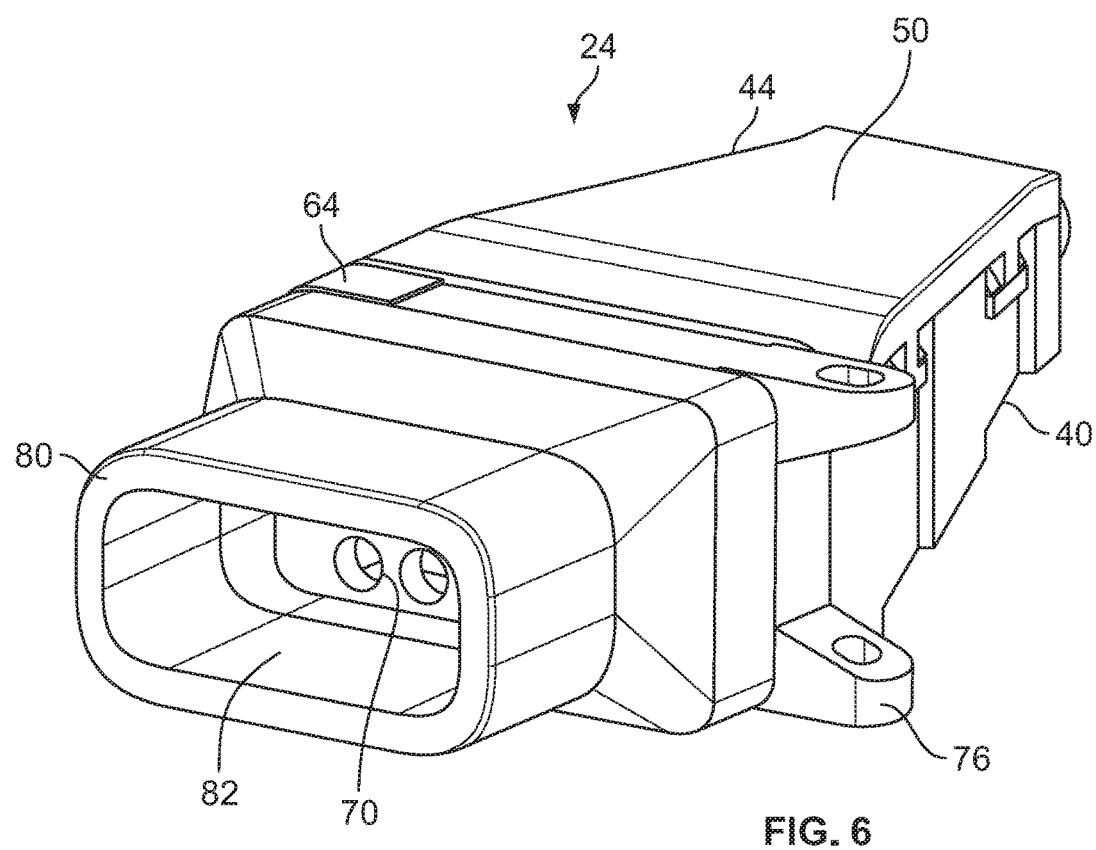
FIG. 6 is a perspective view of the fan-out housing of FIG. 5 taken from an opposite, second perspective.

Referring now to FIGS. 2 and 6, the fan-out housing 24 further includes an end piece 80 (e.g., a boot-like structure) mounted to the end-wall structure 64. The end piece 80 defines the second end 34 (see FIG. 1) of the fan-out housing 24 and in certain examples can provide a bend radius limiting and/or strain relief function for the pigtails 26. The end piece 80 optionally includes a single central, elongated opening 82 (see FIG. 6) in communication with the pigtail openings 70 of the end-wall structure 64. Thus, the fiber optic pigtails 26 are routed through the opening 82 to reach the pigtail openings 70. The interior of the opening 82 can include chamfers or curved surfaces for limiting the amount the pigtails can be bent at the second end 34 of the fan-out housing 24. In certain examples, the end piece 80 can have a construction that is softer and/or more resilient than the end-wall structure 64 and the main body 40. In certain examples, the main body 40 and the end-wall structure 64 are made of a polymeric material such as molded plastic.

Figure 7:
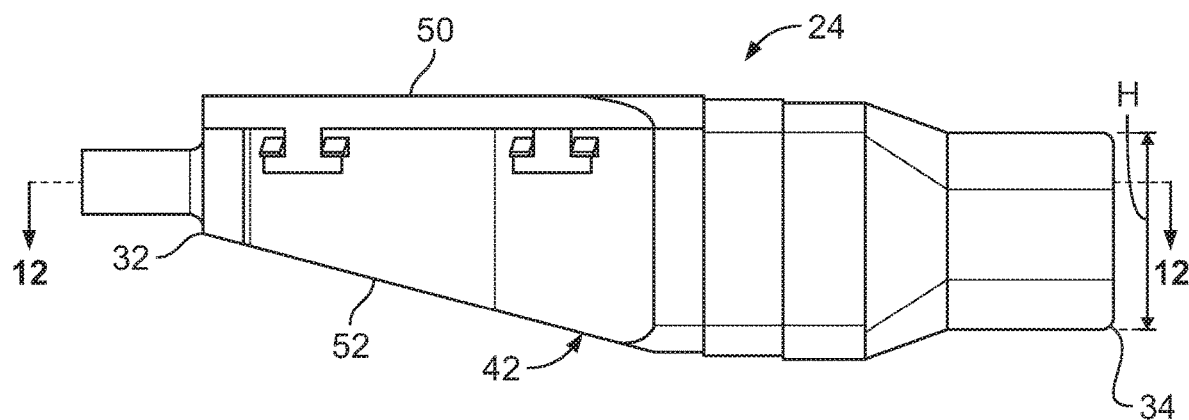
FIG. 7 is a side view of the fan-out housing of FIG. 5.
Figure 8:
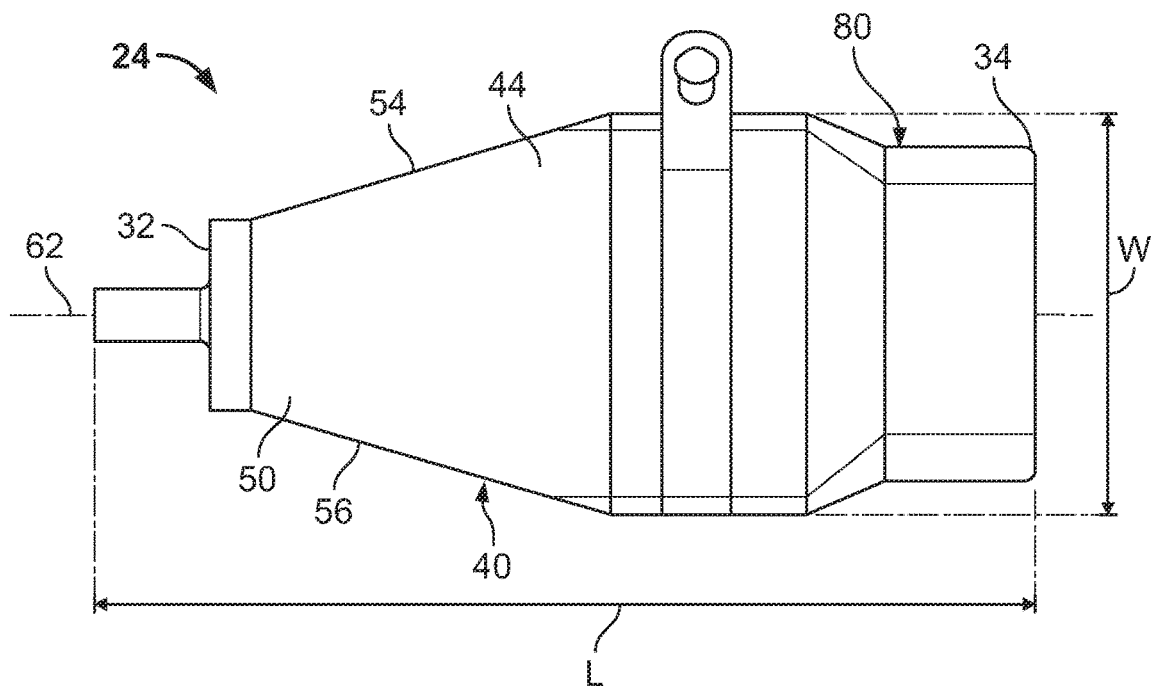
FIG. 8 is a plan view of the fan-out housing of FIG. 5.
Figure 9:
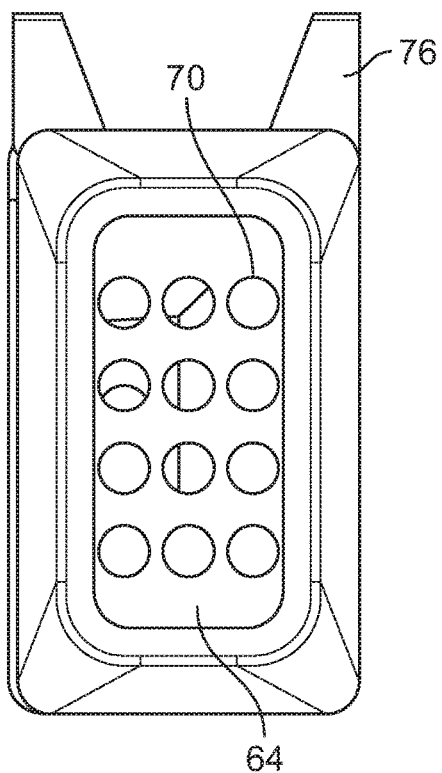
FIG. 9 is an end view of the fan-out housing of FIG. 5.

It is preferred for the fan-out housing 24 to be relatively small. As shown in FIG. 7, the fan-out housing 24 has a height H. As shown in FIG. 8, the fan-out housing 24 has a length L and a width W. In some examples, the fan-out housing 24 has a length L less than or equal to 150 millimeters, a width W less than or equal to 60 millimeters and a height H less than or equal to 40 millimeters. It will be appreciated that the width W does not include the mounting feature 76. In certain examples, the fan-out housing 24 defines a form-factor volume less than or equal to 250 cubic centimeters, or less than or equal to 225 cubic centimeters, or less than or equal to 200 cubic centimeters, or less than or equal to 175 cubic centimeters, or less than or equal to 150 cubic centimeters.

Figure 13:
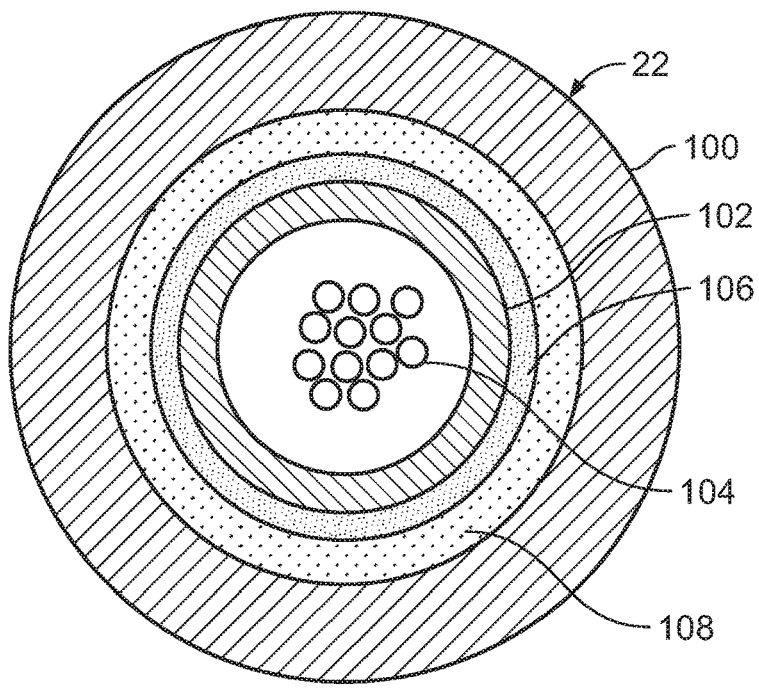
FIG. 13 is a cross-sectional view of a fiber optic cable taken along section line 13-13 of FIG. 3.

Referring now to FIG. 13, the feeder cable 22 includes an outer jacket 100 and an inner buffer tube 102 containing a plurality of optical fibers 104. In one example, the feeder cable 22 has a round transverse cross-sectional shape (such as in the example shown in FIG. 13), although flat feeder cables are also possible. In one example, the feeder cable 22 can define an outer diameter less than 8 millimeters, or less than 7 millimeters, or less than 6 millimeters, or in the range of 4-7 millimeters.

It will be appreciated that the number of optical fibers within the buffer tube 102 can match the number of fiber optic pigtails attached to the fan-out housing 24, or can be different if more than one optical fiber is routed through one or more of the pigtails. Typically, four to twelve optical fibers are routed through the feeder cable 22; but more or fewer optical fibers can also be provided. As depicted, twelve optical fibers 104 are provided within the buffer tube 102.

In certain examples, the buffer tube 102 can be a dry water-blocked central loose tube containing twelve individual, non-ribbonized optical fibers. Water blocking yarns can be provided within the loose buffer tube 102. In certain examples, the feeder cable 22 can include reinforcement. For example, as shown at FIG. 13, the reinforcement can include a layer 106 of reinforcing yarns such as Aramid yarn, and a layer 108 that may include water blocking fiberglass strength members. In certain examples, the strength members can include E-glass.

Figure 13A:
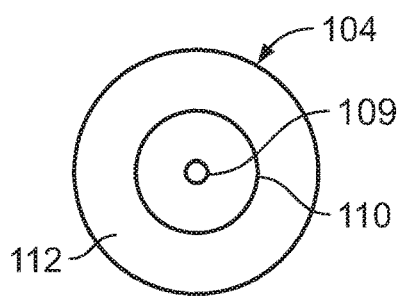
FIG. 13A is a cross-sectional view depicting one of the optical fibers of the fiber optic cable of FIG. 13.

Referring now to FIG. 13A, in certain examples, each of the optical fibers 104 can include a central core 109 surrounding by a cladding layer 110 and a coating layer 112. In one example, the coating layer 112 can include a polymeric material such as acrylate that protects the interior cladding layer 110 and the central core 109. In one example, the coating layer 112 has an outer diameter less than or equal to 275 microns, or less than or equal to 260 microns, or less than or equal to about 250 microns.

Figure 14:
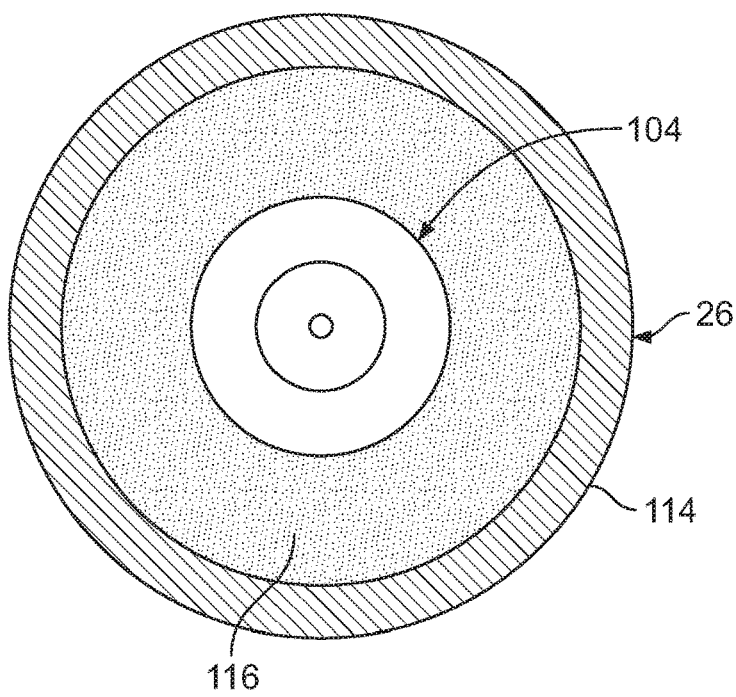
FIG. 14 is a cross-sectional view taken along section line 14-14 of FIG. 3.

Referring now to FIG. 14, in certain examples, the fiber optic pigtails 26 can each have a cable-like construction including an outer jacket 114 (e.g., a furcation tube) that contains a plurality of reinforcing members 116. The outer jacket 114 preferably has a round cross-sectional shape, but could also be flat. In preferred examples, the outer jackets of the fiber optic pigtails 26 each have outer diameters less than the outer diameter of the feeder cable 22. The reinforcing members 116 can provide tensile and/or compressive reinforcement to the fiber optic pigtails 26. In certain examples, the reinforcing members 116 are strand-like, string-like or yarn-like strength members such as Aramid yarns or fiberglass strength members. It is desirable for the reinforcing members 116 to provide tensile reinforcement, without preventing the fiber optic pigtails 26 from being readily bent and moved relative to one another. In certain examples, the reinforcing members 116 provide primarily tensile reinforcement and provide minimal to no compressive reinforcement so as to not interfere with the flexibility of the fiber optic pigtails 26. In certain examples, the fiber optic pigtails 26 are individually movable relative to one another.

Referring back to FIG. 12 (where only two fibers and two pigtails are schematically shown for ease of illustration), it is preferred for no splices to be provided within the fan-out housing 24. Instead, the optical fibers 104 are routed from the feeder cable 22 through the interior volume 71 of the fan-out housing 24 to the outer jackets 114 (see FIG. 14) of the fiber optic pigtails 26. The overall size and volume of the fan-out housing 24 can be reduced by eliminating splicing within the interior of the fan-out housing 24. In other examples, splices may be provided within the fan-out housing 24, in which case fibers corresponding to the fiber optic pigtails 26 would be spliced to corresponding fibers of the feeder cable 22 within the fan-out housing 24. In still other examples, a passive optical splitter or wavelength division multi-plexer can be provided within the fan-out housing 24. In this example, one fiber from the feeder cable 22 can be coupled to an input of the splitter/wavelength division multi-plexer, and outputs of the splitter/wavelength division multi-plexer can be routed to the fiber optic pigtails 26.

As indicated above, the free-ends 28 of the fiber optic pigtails 26 can include hardened de-mateable fiber optic connection interfaces 30 (see FIG. 1). In certain examples, the hardened de-mateable fiber optic connection interfaces 30 can include structure for providing environmental sealing when the connection interfaces are mated with a corresponding connection structure (e.g., a mating fiber optic connector or a mating fiber optic adapter). In certain examples, the hardened de-mateable fiber optic connection interfaces 30 can also include robust fastening structures for mechanically engaging with mating fiber optic connection interfaces (e.g., mating fiber optic connectors or fiber optic adapters). For example, the fastening structures may include twist-to-lock connection interfaces including threads, threaded interfaces, or bayonet style interfaces.

Figure 15:
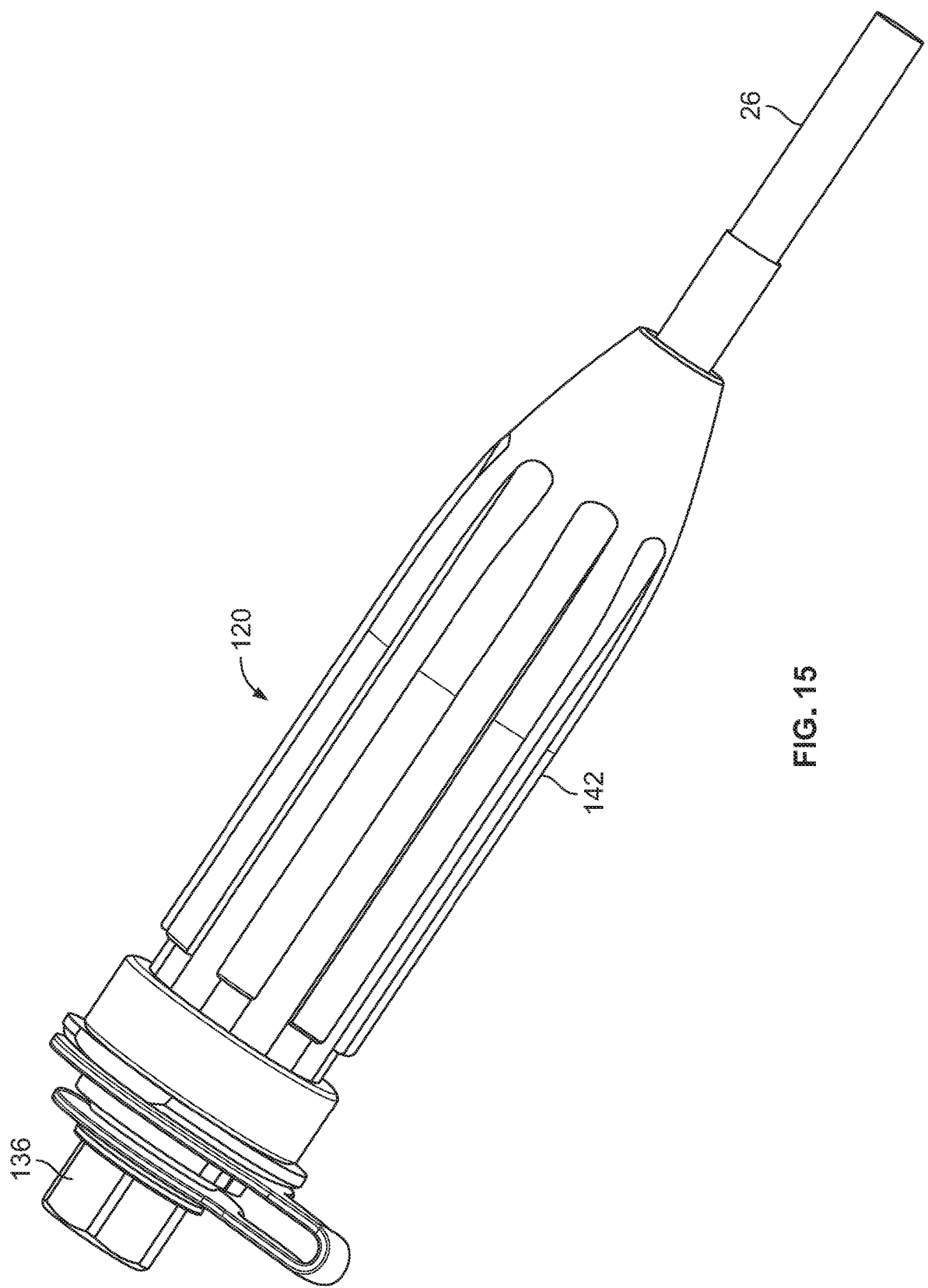
FIG. 15 is a perspective view of an example female hardened fiber optic connector suitable for terminating the free ends of the pigtails of the hardened fan-out assembly of FIG. 1.
Figure 16:
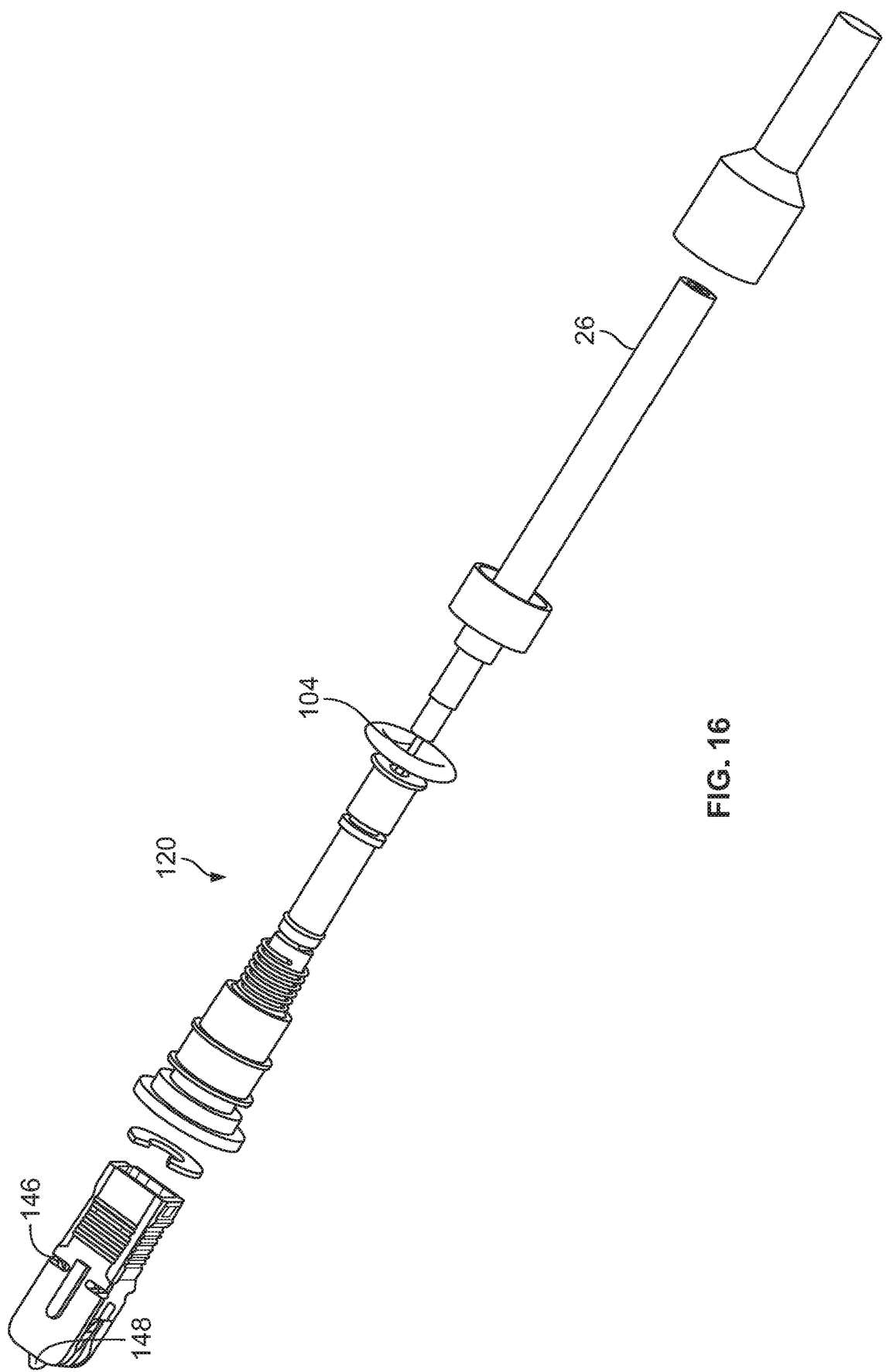
FIG. 16 is an exploded view of the hardened female fiber optic connector of FIG. 15.
Figure 17:
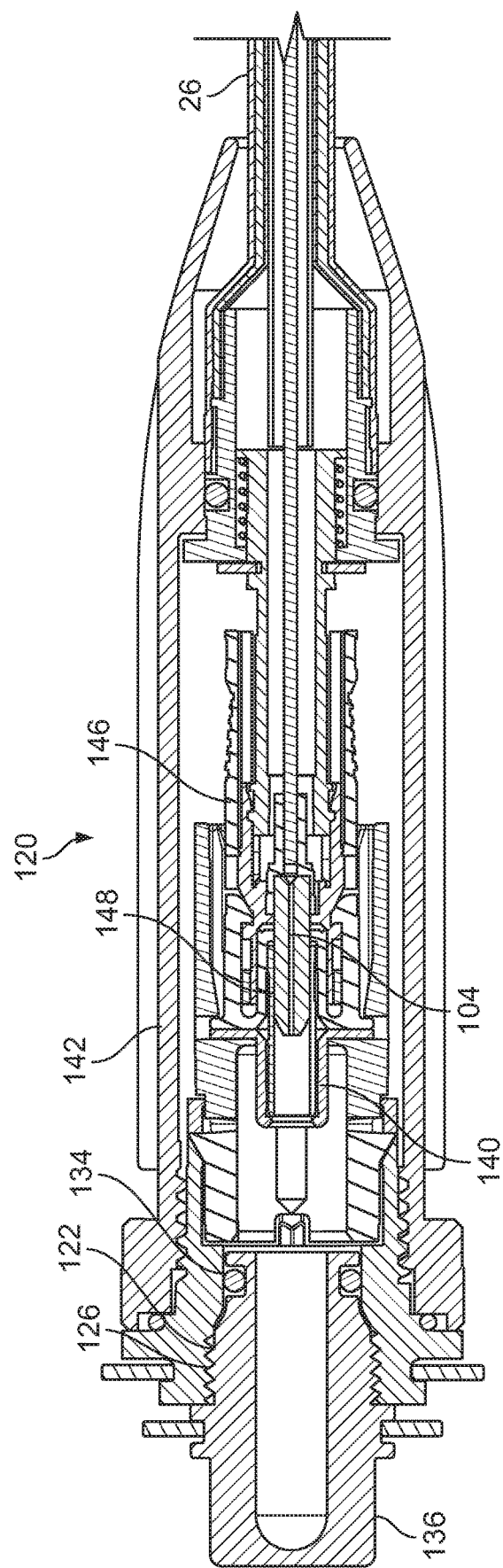
FIG. 17 is a cross-sectional view taken lengthwise through the hardened female fiber optic connector of FIG. 15.

FIGS. 15-17 show an example hardened female fiber optic connector 120 that can be mounted at the ends of the fiber optic pigtails 26. The female fiber optic connector 120 includes a connector port 122 adapted for mating with a corresponding male fiber optic connector such as the fiber optic connector 124 shown at FIGS. 18 and 19. As shown in FIGS. 15-19, the connector port 122 includes internal threads 126 (see FIG. 17) adapted to mate with corresponding threads 128 of a threaded connector 130 of the male fiber optic connector 124 (see FIG. 19). The interface between the internal threads 126 of the connector port 122 and the corresponding threads 128 of the threaded connector 130 function to retain the male fiber optic connector 124 within the connector port 122. The male fiber optic connector 124 further includes a seal 132 (see FIG. 19) that engages a sealing surface 134 (see FIG. 17) within the connector port 122 to provide environmental sealing between the male fiber optic connector 124 and the female fiber optic connector 120. When the connector port 122 is not being used, the connector port 122 can be blocked by a threaded plug 136 having a seal 138 (see FIGS. 15 and 17).

Referring now to FIGS. 16 and 17, the female fiber optic connector 120 further includes a ferrule alignment sleeve 140 positioned within a housing 142 of the female fiber optic connector 120. The ferrule alignment sleeve 140 is coaxially aligned with the connector port 122 and is adapted to receive a ferrule 144 of the male fiber optic connector 124 (see FIG. 19) when the male fiber optic connector 124 is inserted into the connector port 122. The female fiber optic connector 120 further includes an internal fiber optic connector 146 mounted at the end of the optical fiber 104 of the fiber optic pigtail 26 to which the female fiber optic connector 120 is secured. The internal fiber optic connector 146 includes a ferrule 148 in which the end of the optical fiber 104 is secured. The ferrule 148 is positioned within one end of the ferrule alignment sleeve 140. When the male fiber optic connector 124 is inserted into the connector port 122, its corresponding ferrule 144 fits within the opposite end of the ferrule alignment sleeve 140 such that an optical fiber supported by the ferrule 144 of the male fiber optic connector 124 is placed into coaxial alignment with the optical fiber 104 of the fiber optic pigtail 26. In this way, the fiber optic pigtail 26 can be optically coupled to a drop cable or other type of cable.

Figure 18:
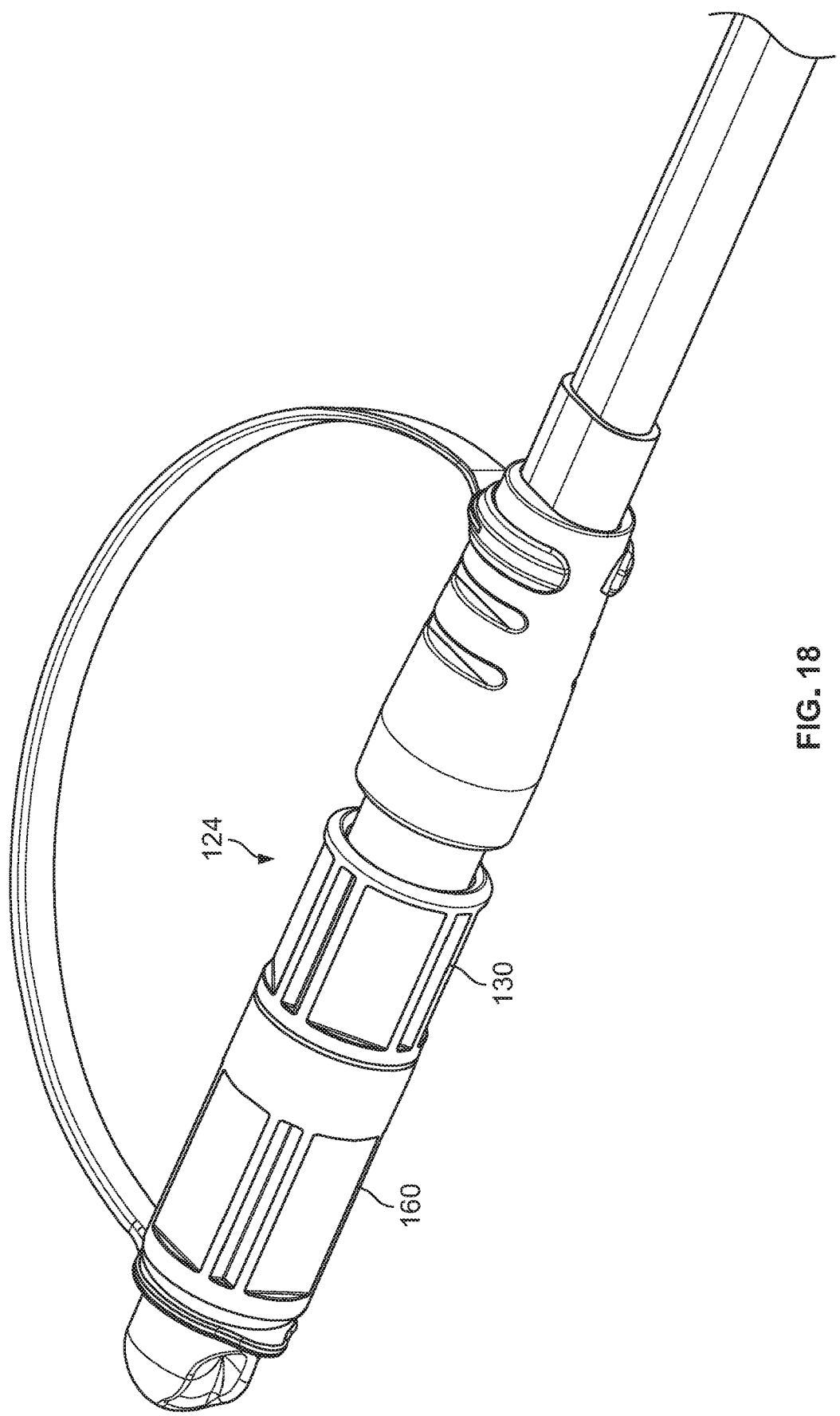
FIG. 18 illustrates a hardened male fiber optic connector that can be mated with the hardened female fiber optic connector of FIGS. 15-17 and/or can be used to terminate the free ends of the pigtails of the hardened fan-out assembly of FIG. 1.
Figure 19:
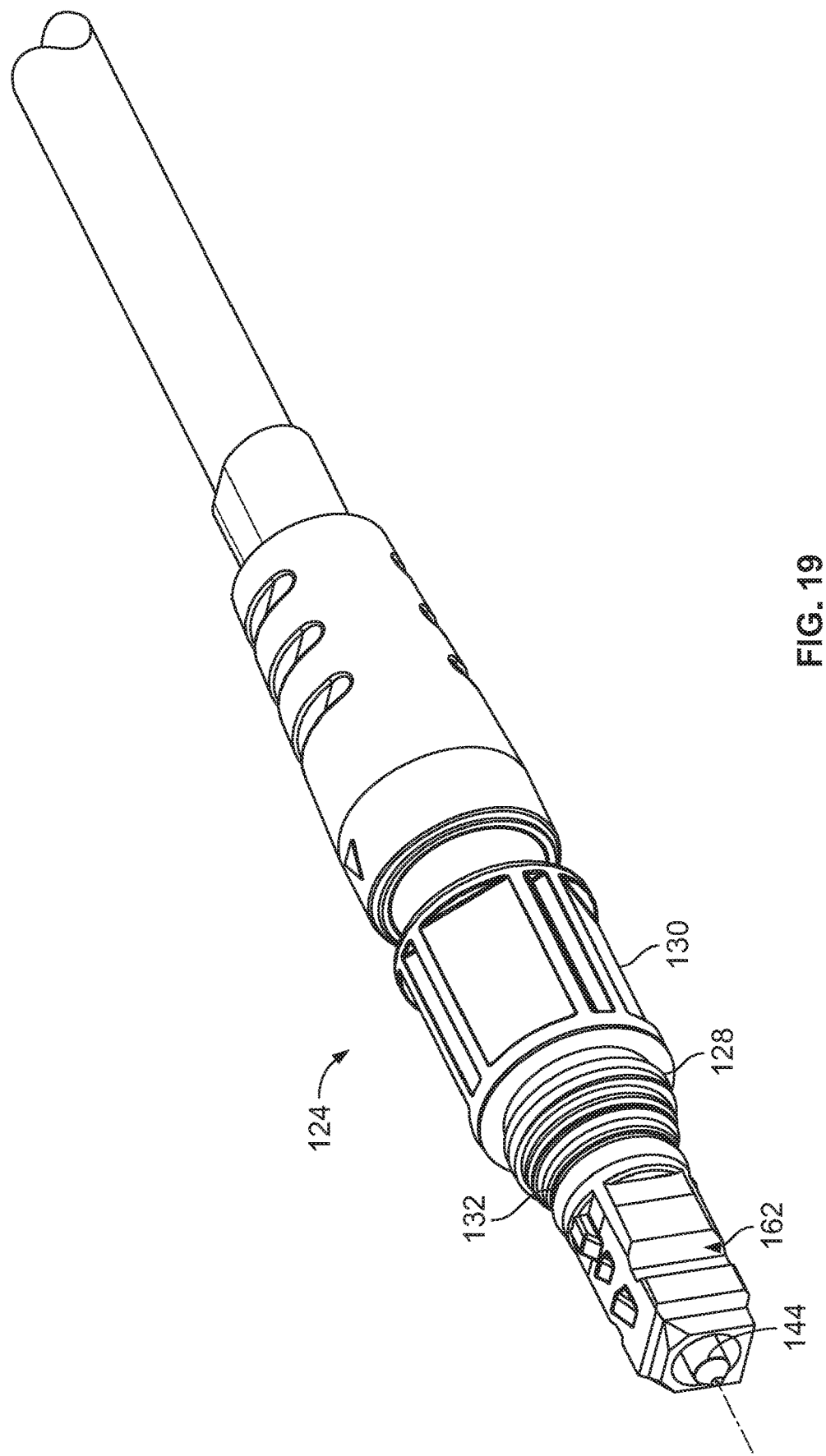
FIG. 19 is a perspective view of the hardened male fiber optic connector of FIG. 18 with the dust cap removed.

FIGS. 18 and 19 show the male fiber optic connector 124. In FIG. 18, a dust cap 160 is shown mounted over a connector body 162 (shown in FIG. 19) of the male fiber optic connector 124. As shown in FIG. 19, the ferrule 144 of the male fiber optic connector 124 is positioned at a distal end of the connector body 162. The connector body 162 forms a plug portion adapted to be received within the connector port 122 of the female fiber optic connector 120. The threaded connector 130 functions to secure the dust cap 160 over the connector body 162. The threaded connector 130 also functions to secure the male fiber optic connector 124 within the connector port 122 of the female fiber optic connector 120.

Figure 20:
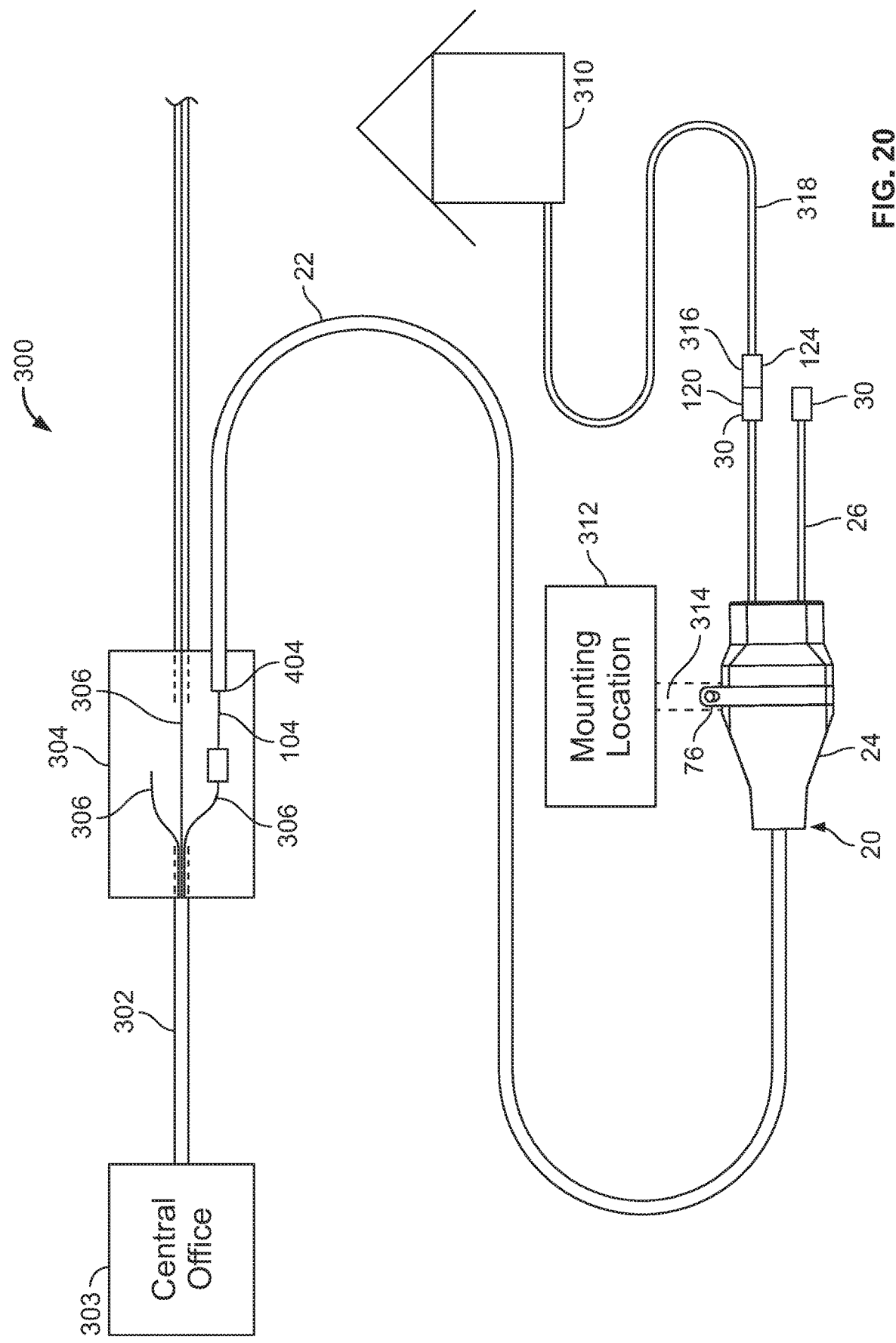
FIG. 20 shows the hardened fan-out assembly of FIG. 1 incorporated into a fiber optic network.
Figure 21:
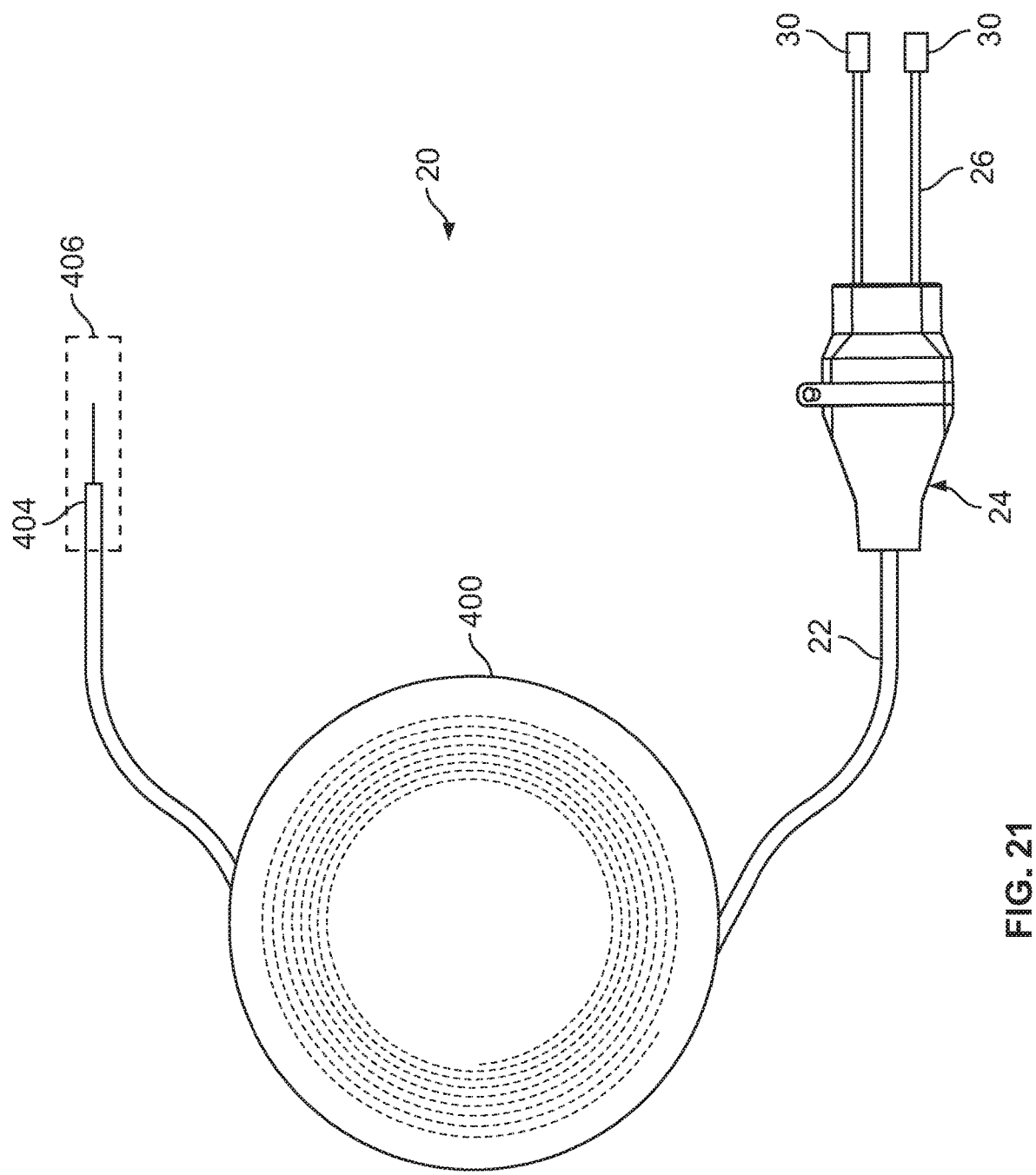
FIG. 21 illustrates the hardened fan-out assembly of FIG. 1 with the feeder cable coiled around a cable storage spool prior to the hardened fan-out assembly being incorporated into a fiber optic network.

FIG. 20 shows the hardened fan-out assembly 20 incorporated into a fiber optic network 300. The fiber optic network 300 includes a distribution cable 302 that extends from a central office 303 or other central location (e.g., a head-end) outwardly toward an edge of the network. The fiber optic network 300 also includes an environmentally sealed outdoor enclosure 304. In certain examples, the outdoor enclosure 304 is re-enterable and can include optical components such as splice trays, fiber optic splitters, wavelength division multiplexers or other structures.

In the depicted example, the distribution cable 302 passes through the outdoor enclosure 304. The outdoor enclosure 304 can include sealed cable ports for sealing the distribution cable 302 at the cable entry and exit locations of the enclosure 304. The distribution cable 302 can include a plurality of optical fibers 306 at least some of which pass through the enclosure 304. In certain examples, a plurality of the optical fibers 306 can be accessed within the enclosure 304 and can be optically spliced to the optical fibers 104 of the feeder cable 22 (see FIG. 12). The optical splices can include fusion splices or mechanical splices. In certain examples, the splices can be protected by splice protecting sleeves and can be supported on trays and optical fiber within the enclosure 304 can be managed on trays. The splices can be individual splices or mass fusion splices. In other examples, a passive optical power splitter or wavelength division multi-plexer (WDM) may be provided within the enclosure 304. In such a case, one of the optical fibers 306 from the distribution cable 302 can be accessed and optically coupled to an input side of the optical splitter/WDM. Fiber optic outputs from the optical power splitter/WDM can be spliced to the optical fibers 104 of the feeder cable 22.

The feeder cable 22 is preferably relatively long and can be routed to a location in fairly close proximity to a subscriber location 310. A fastening arrangement 314 such as a bracket or one or more fasteners can interface with the mounting feature 76 of the fan-out housing 24 to secure the fan-out housing 24 to a mounting location 312. The mounting location 312 can be an aerial location such as an aerial cable, or on a pole. The mounting location 312 can also include a wall (e.g., a building wall) or other location such as within a hand-hole. Thus, the fan-out housing 24 can be mounted above ground or below ground and is preferably environmentally sealed so as to be rated for either of such applications.

As shown at FIG. 20, the hardened de-mateable fiber optic connection interface 30 at the end of a pigtail 26 is mateable with a hardened fiber optic connector 316 of a drop cable 318 routed to the subscriber location 310. In certain examples, the drop cable 318 can be routed to a network interface device provided at the subscriber location. In one example, the hardened de-mateable fiber optic connection interface 30 includes one of the hardened female fiber optic connectors 120 (see FIGS. 15-17), and the hardened connector 320 includes one of the hardened male fiber optic connectors 124 (see FIGS. 18 and 19).

Prior to installation of the hardened fan-out assembly 20, the hardened fan-out assembly 20 can be packaged to be ready for shipment. For example, as shown in FIG. 22, the feeder cable 22 can be coiled about a spool 400. Such a spool 400 is helpful for shipping, and also facilitates deploying the hardened fan-out assembly 20 in the field by allowing the feeder cable to be dispensed from the spool by pulling the feeder cable off the spool such that the spool rotates during cable deployment/routing. In certain examples, an end 404 of the feeder cable 22 opposite from the fan-out housing 24 is not connectorized. For example, the optical fibers at the end 404 can be pre-processed or factory processed so as to be splice-ready in the field. For example, the fibers can be stripped, cleaved and cleaned in the factory. After stripping, cleaning and cleaving, a protective packaging or enclosure 406 can be positioned over the processed fiber ends to protect the optical fibers during shipment. The protective packaging or enclosure 406 can be removed in the field when it is desired to splice the optical fibers to other optical fibers. The optical fibers can be processed to facilitate single fiber splicing in the field (e.g., mechanical or fusion splicing), or mass splicing in the field (mass mechanical or fusion splicing). In the case where the optical fibers are prepared for mass fusion splicing, portions of the optical fibers near the end 404 can be ribbonized.

While, for the application at hand, it is preferred for the optical fiber ends at the end 404 of the feeder cable 22 to be splice-ready, in other examples the fiber ends can be connectorized with non-hardened or hardened fiber optic connectors. The fiber optic connectors can include male or female fiber optic connectors and can include single fiber connectors corresponding to each optical fiber or one or more multi-fiber fiber optic connectors. The fiber optic connectors can include ferruled connectors or ferrule-less connectors.

Various modifications and alterations of this disclosure will become apparent to those skilled in the art without departing from the scope and spirit of this disclosure, and it should be understood that the scope of this disclosure is not to be unduly limited to the illustrated examples set forth herein.

We claim:

1. A hardened fiber optic fan-out arrangement comprising:
   a fan-out housing;
   a plurality of fiber optic pigtails that project outwardly from the fan-out housing, the fiber optic pigtails having free ends including hardened de-mateable fiber optic connection interfaces;
   a fiber optic feeder cable that projects outwardly from the fan-out housing, the fiber optic feeder cable being optically coupled to the fiber optic pigtails;
   wherein the hardened fiber optic fan-out arrangement has an in-line configuration in which the fiber optic pigtails project from a first end of the fan-out housing, and the feeder cable projects from an opposite second end of the fan-out housing;

wherein the fan-out housing includes a main body formed by a base and a cover, wherein the main body defines a major end and a minor end, wherein the feeder cable attaches to the fan-out housing at the minor end, wherein the main body includes opposite major sides and opposite minor sides that extend between the major and minor ends of the main body, wherein the base defines one of the major sides and the minor sides, and wherein the cover defines the other major side;

wherein the minor sides are angled to converge as the minor sides extend toward the minor end of the main body; and wherein the major sides converge as the major sides extend toward the minor end of the main body.

2. The hardened fiber optic fan-out arrangement of claim 1, wherein optical fibers are routed from the feeder cable through the fan-out housing to the fiber optic pigtails without any splices within the fan-out housing.

3. The hardened fiber optic fan-out arrangement of claim 1, wherein the fan-out housing is filled with a filling material that encapsulates the optical fibers within the fan-out housing, encapsulates an end of the feeder cable within the fan-out housing and encapsulates ends of the fiber optic pigtails within the fan-out housing.

4. The hardened fiber optic fan-out arrangement of claim 1, wherein the minor end defines a cable opening for receiving the feeder cable, wherein the cable opening defines an axis parallel to the cover, and wherein one of the major sides is angled relative to the cable axis.

5. The hardened fiber optic fan-out arrangement of claim 1, wherein the minor end includes a stub defining a cable opening that receives the feeder cable, and wherein a heat shrink sleeve is adhesively secured to the stub and the feeder cable.

6. The hardened fiber optic fan-out arrangement of claim 1, wherein an end wall structure is secured to the major end of the main body of the fan-out housing by a slide-lock configuration, and wherein the end wall structure defines pigtail openings for receiving the fiber optic pigtails.

7. The hardened fiber optic fan-out arrangement of claim 1, wherein the cover is latched to the main body.

8. A hardened fiber optic fan-out arrangement comprising:
a fan-out housing;
a plurality of fiber optic pigtails that project outwardly from the fan-out housing, the fiber optic pigtails having free ends including hardened de-mateable fiber optic connection interfaces;
a fiber optic feeder cable that projects outwardly from the fan-out housing, the fiber optic feeder cable being optically coupled to the fiber optic pigtails;
wherein the pigtails have lengths less than or equal to 3 meters;
wherein the feeder cable has a length greater than or equal to 50 meters; and
wherein the fan-out housing includes a main body, the main body includes a base and a cover, the main body defines a major end and a minor end, the minor end defines a cable opening for receiving the feeder cable, the cable opening defines an axis extending longitudinally through a length of the fan-out housing, the main body further defines opposite major sides and opposite minor sides that extend between the major and minor ends of the main body, wherein the base defines one of the major sides and the cover defines the other major side, wherein the major side defined by the cover is parallel to the axis defined by the cable opening, and wherein the major side defined by the base is angled relative to the axis defined by the cable opening.

9. The hardened fiber optic fan-out arrangement of claim 8, wherein the feeder cable has an end opposite the fan-out housing that is not connectorized.

10. The hardened fiber optic fan-out arrangement of claim 8, wherein the feeder cable has an end opposite the fan-out housing that is prepared for splicing.

11. The hardened fiber optic fan-out arrangement of claim 8, wherein the feeder cable has an end opposite the fan-out housing where the optical fibers have been factory prepared for splicing.

12. The hardened fiber optic fan-out arrangement of claim 8, wherein the feeder cable has an end opposite the fan-out housing where the optical fibers have been factory stripped, cleaved, and cleaned.

13. The hardened fiber optic fan-out arrangement of claim 8, wherein the feeder cable has an end opposite the fan-out housing where the optical fibers have been factory prepared for splicing and are protected in protective packaging.

14. The hardened fiber optic fan-out arrangement of claim 13, wherein the feeder cable is coiled on a spool at a manufacturing facility to facilitate shipping, handling and installation of the hardened fiber optic fan-out arrangement.

15. The hardened fiber optic fan-out arrangement of claim 1, wherein the fan-out housing has a form factor volume less than or equal to 250 cubic centimeters.

16. The hardened fiber optic fan-out arrangement of claim 1, wherein the fan-out housing has a form factor volume less than or equal to 150 cubic centimeters.

17. The hardened fiber optic fan-out arrangement of claim 1, wherein the minor end defines a cable opening for receiving the feeder cable, wherein the cable opening defines an axis that extends longitudinally through a length of the fan-out housing, wherein the major side defined by the cover is parallel to the axis defined by the cable opening, and wherein the major side defined by the base is angled relative to the axis defined by the cable opening.

18. The hardened fiber optic fan-out arrangement of claim 1, wherein the fan-out housing further includes an opening for the fiber optic pigtails to project through, and wherein the opening is completely defined by the base.

19. The hardened fiber optic fan-out arrangement of claim 1, wherein the fan-out housing further includes a cable opening for receiving the feeder cable, and wherein the cable opening is completely defined by the base.

20. The hardened fiber optic fan-out arrangement of claim 1, wherein the base completely defines the minor end, the major end, the minor sides, and one of the major sides.

* * * * *